(12) United States Patent
Fitzgerald et al.

(10) Patent No.: US 12,082,670 B2
(45) Date of Patent: Sep. 10, 2024

(54) TOTE-DOLLY SYSTEM

(71) Applicant: Valet Living, LLC, Tampa, FL (US)

(72) Inventors: Thomas M Fitzgerald, Havertown, PA (US); Nicholas Choma, Tampa, FL (US); Marc William Cramer, Tampa, FL (US)

(73) Assignee: Valet Living, LLC, Tampa, FL (US)

( * ) Notice: Subject to any disclaimer, the term of this patent is extended or adjusted under 35 U.S.C. 154(b) by 113 days.

(21) Appl. No.: 16/932,132

(22) Filed: Jul. 17, 2020

(65) Prior Publication Data

US 2021/0015230 A1 Jan. 21, 2021

Related U.S. Application Data

(60) Provisional application No. 62/875,016, filed on Jul. 17, 2019.

(51) Int. Cl.
| | |
|---|---|
| *A45C 13/38* | (2006.01) |
| *A45C 3/00* | (2006.01) |
| *A45C 13/10* | (2006.01) |
| *B62B 3/00* | (2006.01) |
| *B62B 3/02* | (2006.01) |
| *B62B 3/04* | (2006.01) |

(52) U.S. Cl.
CPC .............. *A45C 13/385* (2013.01); *A45C 3/00* (2013.01); *A45C 13/10* (2013.01); *B62B 3/008* (2013.01); *B62B 3/02* (2013.01); *B62B 3/04* (2013.01); *A45C 2013/1015* (2013.01); *B62B 2205/104* (2013.01)

(58) Field of Classification Search
CPC ......... A45C 13/385; A45C 3/00; A45C 13/10; A45C 2013/1015; B62B 3/008; B62B 3/02; B62B 3/04; B62B 2205/104; B62B 2202/26; B62B 5/0093; B62B 2202/66; B62B 2203/44
USPC ............... 15/323, 339; 248/205.2; 280/79.11
See application file for complete search history.

(56) References Cited

U.S. PATENT DOCUMENTS

| | | | | |
|---|---|---|---|---|
| 2,717,437 A | * | 9/1955 | De Mestral ........ | A44B 18/0038 428/95 |
| 2,740,981 A | * | 4/1956 | Famolare ................ | A47L 9/009 15/327.2 |
| 2,917,769 A | * | 12/1959 | Kasper .................... | A47L 9/009 280/79.5 |
| 3,904,218 A | * | 9/1975 | Kostic ................... | B65F 1/1607 D34/8 |

(Continued)

OTHER PUBLICATIONS https://www.amazon.com/ONE-WRAP-Tape-25-Yard-ROLL/dp/B071Y3TVNT?th=1 (Year: 2012).*

*Primary Examiner* — Don M Anderson
*Assistant Examiner* — Justin Caudill
(74) *Attorney, Agent, or Firm* — Thomas H. Stanton

(57) ABSTRACT

A tote-dolly system is configured to enable quick detachable attachment of the tote to the dolly. An exemplary tote has one or more tote-fasteners that can be quickly engaged with corresponding dolly-fasteners. An exemplary fastener may be a buckle having a clip and receiver that is quickly engaged. A preferred fastener is a hook-and-loop fastener configured on the top of the dolly and on the bottom of the (Continued)

tote. It may be preferred to have one of the tote-dolly components have discrete pieces of hook-and-loop fastener to facilitate detachment of the components.

5 Claims, 7 Drawing Sheets

(56) References Cited

U.S. PATENT DOCUMENTS

| | | | | |
|---|---|---|---|---|
| 3,997,072 A * | 12/1976 | Guth | ............ | B65F 1/12 |
| | | | | 141/390 |
| 4,167,271 A * | 9/1979 | Jorgensen | ............ | B65F 1/1468 |
| | | | | 280/79.5 |
| 4,180,113 A * | 12/1979 | Liebling | ............ | D06F 95/004 |
| | | | | 383/7 |
| 4,342,131 A * | 8/1982 | Reid | ............ | A47L 7/0071 |
| | | | | 15/352 |
| 4,414,692 A * | 11/1983 | Dzierson | ............ | B65D 81/3876 |
| | | | | 2/160 |
| 4,424,841 A * | 1/1984 | Smith | ............ | A45C 7/0086 |
| | | | | 190/110 |
| 4,784,676 A * | 11/1988 | Hale | ............ | A47L 9/181 |
| | | | | 96/342 |
| 4,842,228 A * | 6/1989 | Kasper | ............ | B65F 1/1415 |
| | | | | 220/908 |
| 5,515,573 A * | 5/1996 | Frey | ............ | A47L 5/365 |
| | | | | 15/327.2 |
| 5,758,888 A * | 6/1998 | Burgan | ............ | B65F 1/14 |
| | | | | 280/79.5 |
| 6,047,842 A * | 4/2000 | Feidt | ............ | B25H 3/026 |
| | | | | 220/23.88 |
| 6,488,293 B1 * | 12/2002 | Mitchell | ............ | B62B 3/104 |
| | | | | 280/79.5 |
| 7,677,580 B2 * | 3/2010 | Vanderberg | ............ | B62B 3/10 |
| | | | | 280/79.5 |
| 9,162,694 B1 * | 10/2015 | Fucarino | ............ | B62B 1/14 |
| 10,286,943 B1 * | 5/2019 | Greenblatt | ............ | B62B 5/0093 |
| 10,376,030 B1 * | 8/2019 | Koh | ............ | A45C 13/385 |
| 2003/0038008 A1 * | 2/2003 | Han | ............ | A45C 3/00 |
| | | | | 190/102 |
| 2010/0147642 A1 * | 6/2010 | Andochick | ............ | A45C 5/14 |
| | | | | 206/315.3 |
| 2011/0256792 A1 * | 10/2011 | Silver | ............ | A45C 9/00 |
| | | | | 190/18 A |
| 2017/0030008 A1 * | 2/2017 | Calise | ............ | A45C 13/385 |

* cited by examiner

TOTE-DOLLY SYSTEM

CROSS REFERENCE TO RELATED APPLICATIONS

This invention claims the benefit of U.S. provisional patent No. 62/875,016, filed on Jul. 17, 2019; the entirety of which is hereby incorporated by reference herein.

BACKGROUND OF THE INVENTION

Field of the Invention

The invention relates to tote dolly attachment system wherein the tote is quickly and easily detachably attachable to a dolly.

Background

Totes are placed on dollies for the purpose of collection linens, such as bedsheets and towels, in the tote. A tote and dolly are used by hotel staff for example to collect linens as the rooms are cleaned. When moving a tote from room to room, the tote can easily be displaced and fall off of the dolly. This wastes time and requires the cleaning staff to replace the tote on the dolly, thereby wasting time and requiring the staff to pick up the tote which can be heavy.

SUMMARY OF THE INVENTION

The invention is directed to a tote-dolly system that enables quick detachable attachment of the tote to the dolly. An exemplary tote comprises one or more tote-fasteners that can be quickly engaged with corresponding dolly-fasteners. An exemplary fastener may be a buckle having a clip and receiver that is quickly engaged. A preferred fastener is a hook-and-loop fastener configured on the top of the dolly and configured to engage with hook-and-loop fastener configured on the bottom of the tote. A dolly has a dolly frame or platform with wheels coupled thereto. A tote may be a bag configured to carry and retain articles and an exemplary tote may be free-standing, wherein the tote will stand upright on its bottom or base with the top opening open for receiving articles therein. A tote may be made out of a fabric or plastic that is free-standing, for example.

An exemplary buckle type tote-fastener may be coupled to the tote, such as to the side of the tote, by a tote-fastener extension, such as a strap, to enable some mobility of the fastener to allow for alignment and engagement with the dolly-fastener. The buckle type dolly-fastener may also be coupled to the dolly by a dolly-fastener extension, such as a piece of fabric extending from the dolly to the buckle. The length of a fastener extension, tote and/or dolly fastener extension, may be about 25 mm or more about 50 mm or more, about 100 mm or more and any range between and including the lengths provided. In another embodiment, only one of the tote-fastener or dolly-fastener has a fastener extension and the other portion of the buckle on the other component is attached to the component without an extension. An exemplary tote-dolly system may comprise one or more buckle fasteners that couples the tote to the dolly, or two or more, or three or more, or four or more, or five or more. Two or more buckles are preferred to ensure the tote does not slip off of the dolly.

An exemplary tote-dolly system may comprise a dolly-fastener configured with hook-and-loop fastener configured on a dolly extension, such as a strap. The hook-and-loop fastener may be configured on or proximal to an extended end of the dolly extension or strap, and the tote may be configured with hook-and-loop fastener configured along the sides of the tote for coupling with the hook-and-loop fastener configured on the dolly-extension. The tote hook-and-loop fastener may be configured in a ring that extends around the tote at some distance up from the bottom or may be configured with discrete hook-and-loop fasteners configured to correspond with the location of the dolly extension having said hook-and-loop fastener configured thereon. A ring type hook-and-loop fastener configured around the tote may make it easier for alignment of the two components of the hook-and-loop fastener. A ring of hook-and-loop fastener of the tote or the dolly may extend some portion around the perimeter of the tote, such about substantially about the perimeter or at least 50% around the perimeter.

An exemplary hook-and-loop fastener may be discrete, wherein it does not extend in a ring or across the entire top surface of the dolly or bottom surface of the tote. Configuring at least one of the tote or dollies with discrete hook-and-loop fastener may aid in the detachment of the two components. A completely engaged surface or a ring of hook-and-loop fastener may be more difficult to disengage. One of the tote-dolly systems may be configured with a plurality of discrete hook-and-loop fasteners pads or pieces, such as two or more, three or more, four or more, five or more and any range between and including the number of discrete pieces listed. Each discrete pad may have a dimension, length and/or width of about 200 mm or less, about 180 mm or less, about 160 mm or less, about 140 mm or less, about 120 mm or less, about 100 mm or less. An exemplary discrete hook-and-loop fastener may have an area of about 30 $cm^2$ or more about 50 $cm^2$ or more about 70 $cm^2$ or more about 100 $cm^2$ or more, or no more than 150 $cm^2$, or no more than about 100 $cm^2$.

The summary of the invention is provided as a general introduction to some of the embodiments of the invention, and is not intended to be limiting. Additional example embodiments including variations and alternative configurations of the invention are provided herein.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

Figure 1:
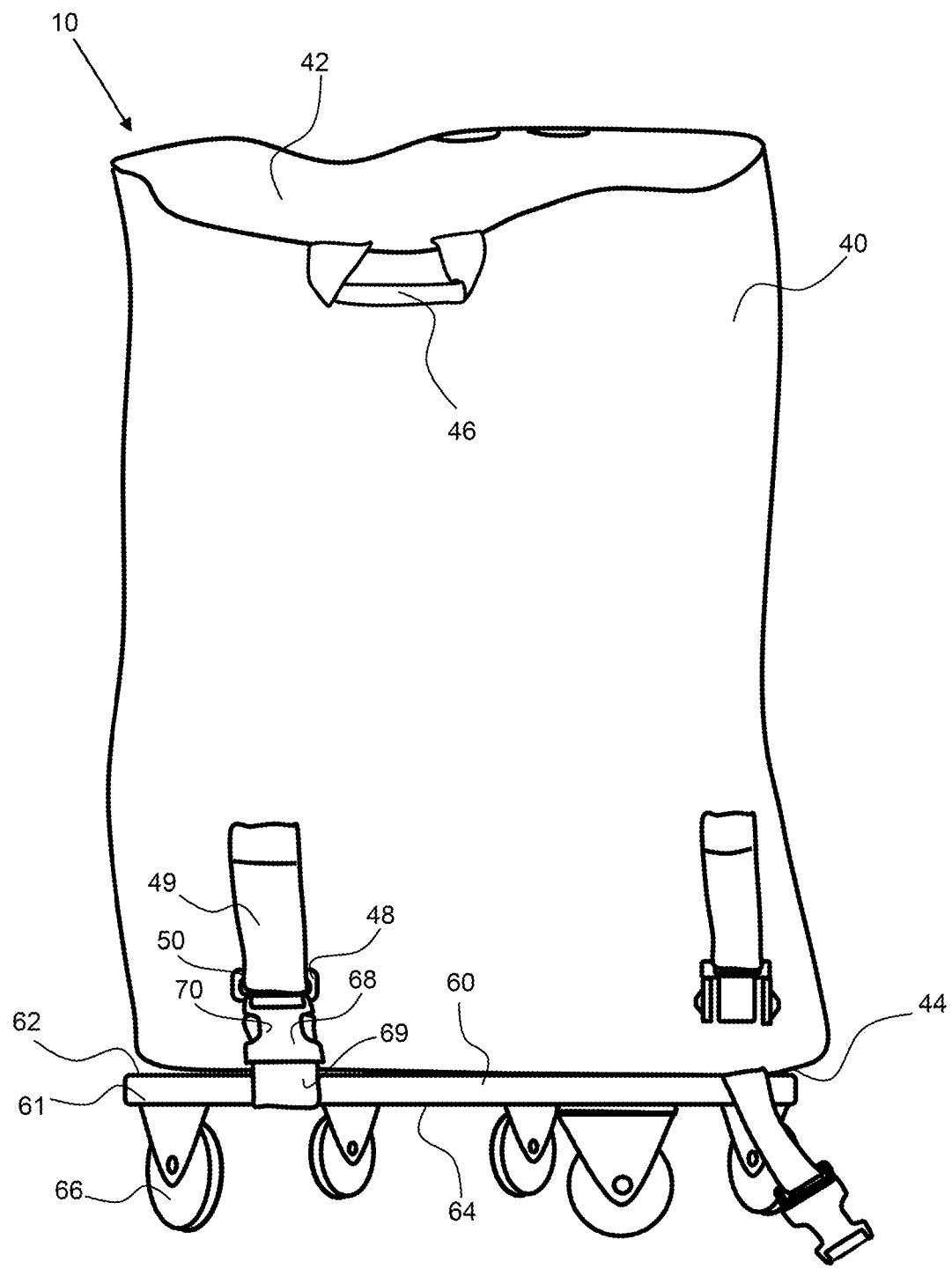
FIG. 1 shows a side view of an exemplary tote-dolly system comprising a tote detachably attached to a dolly.
Figure 2:
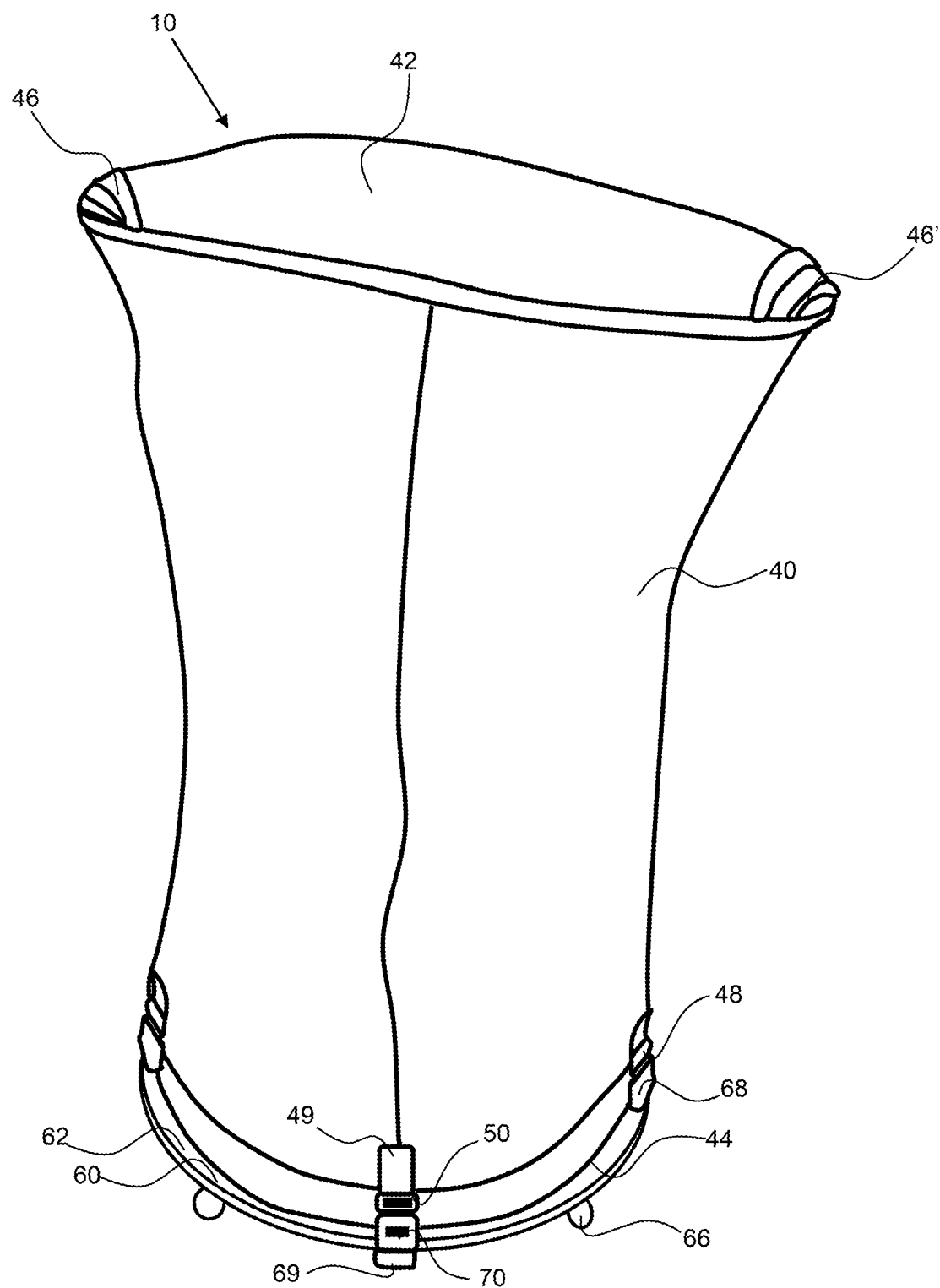
FIG. 2 shows a top perspective view of an exemplary tote-dolly system comprising a tote detachably attached to a dolly.
Figure 3:
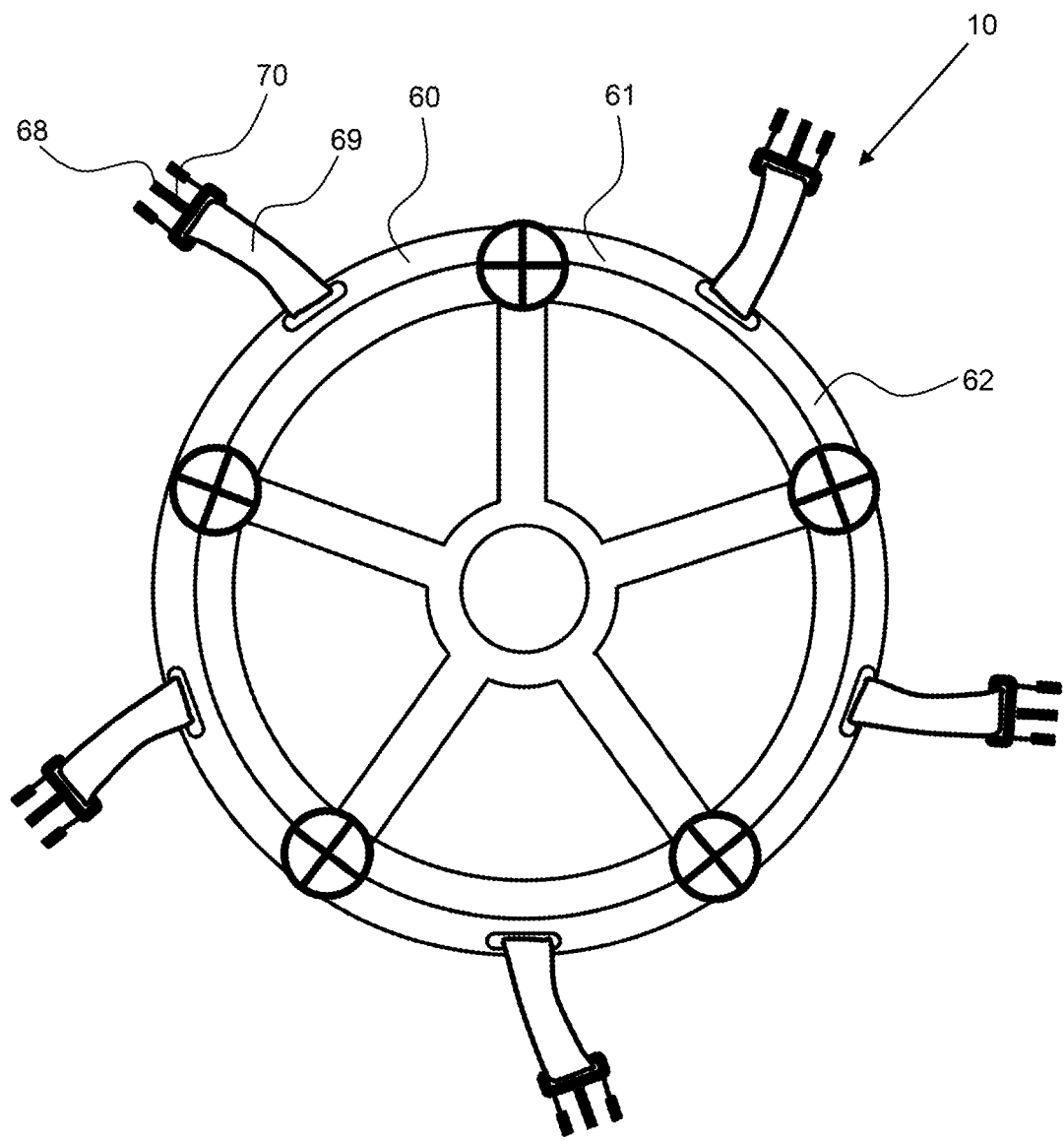
FIG. 3 shows a top view of an exemplary dolly having a plurality of dolly fasteners, buckles, extending from the dolly by dolly-fastener extensions.
Figure 4:
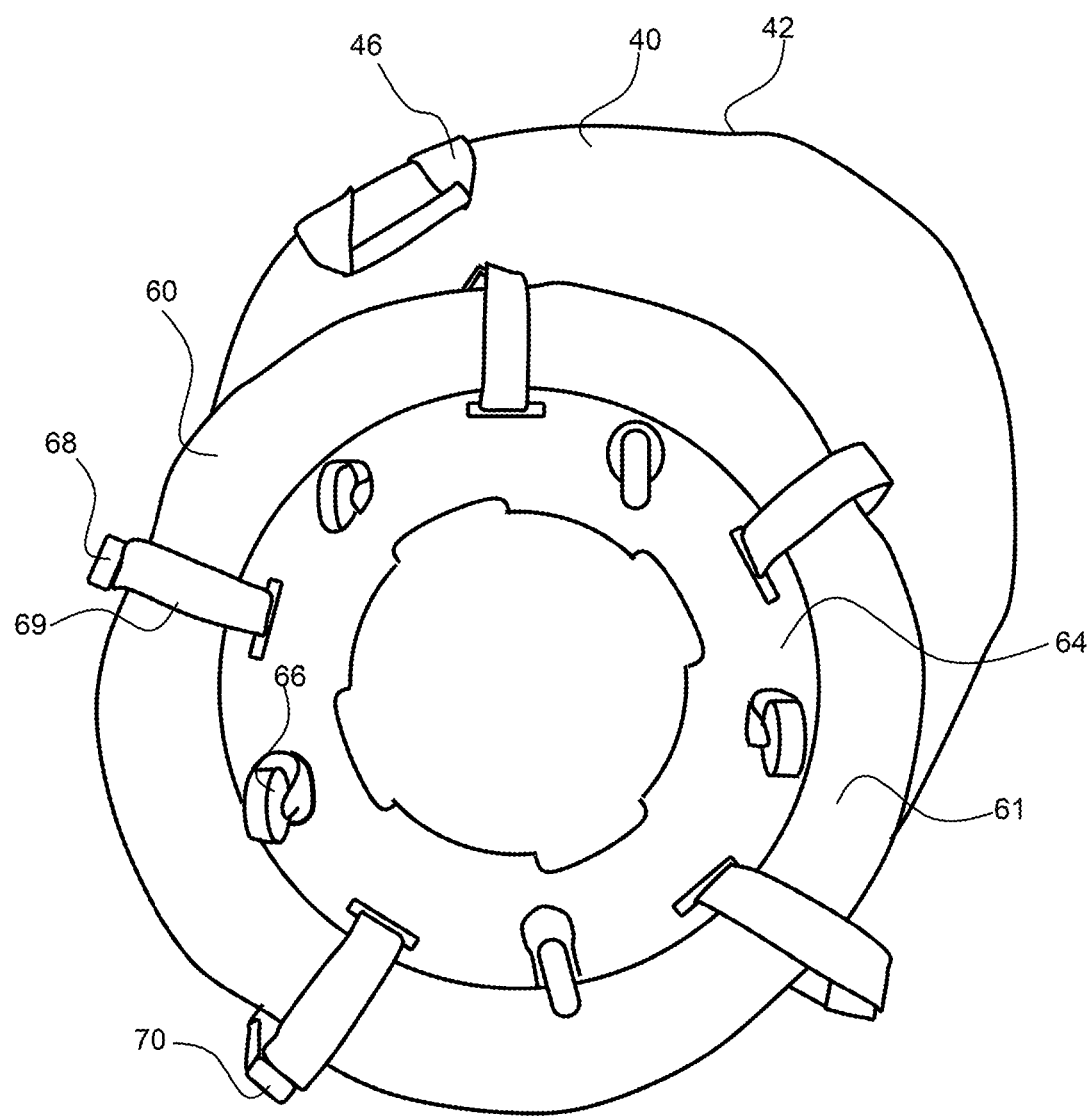
FIG. 4 shows bottom view of an exemplary tote-dolly system comprising a tote detachably attached to a dolly.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

Definitions

Hook-and-loop is a fastener closure system having a hook portion and a loop portion. The hook portion hooks around the loop portion to detachably attach the two components of the hook-and-loop fastener.

Substantially evenly spaced around the bottom of the tote with reference to discrete hook-and-loop fasteners, or the buckles on extensions means that the plurality of fasteners are configured at even intervals, or degrees about dolly and/or tote within about 15 degrees of the interval. For example, three discrete hook-and-loop fasteners would be configured every about 120 degrees, or within 105 and 135 degrees from each other, and four discrete hook-and-loop fasteners would be configured every about 90 degrees from each other or within 75 and 105 degrees.

Referring to FIGS. 1 to 4, an exemplary tote-dolly system 10 comprises a tote 40 that is detachably attachable to a dolly 60. The exemplary tote is tubular shaped having a top opening 42 for receiving articles such as linens including towels and bed sheets. The bottom 44 of the tote is configured on the top 62 of the dolly and is secured to the tote by the tote-fastener 48, a tote-buckle 50 coupled with the dolly-fastener 68, also a dolly-buckle 70. The tote-buckle and the dolly-buckle may clip together having one portion that is inserted in to the opposing portion. The tote-fastener is coupled to the tote frame 61 by a tote-fastener extension 49 and the dolly-fastener is coupled to the dolly by a dolly-fastener extension 69. The dolly has a plurality of wheels 66 extending from the bottom 64 of the dolly to allow the tote to be moved easily from room to room to collect lines, for example. The tote has a pair of handles 46 to guide the tote-dolly system and to aid in picking up the tote.

Figure 5:
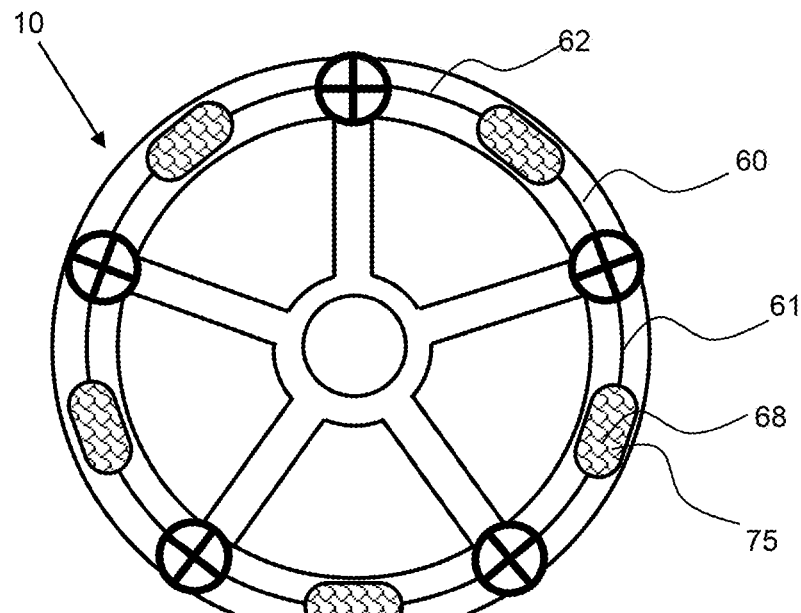
FIG. 5 shows a top view of an exemplary dolly having a plurality of discrete hook-and-loop fasteners on the top surface for detachably attaching the tote.
Figure 6:
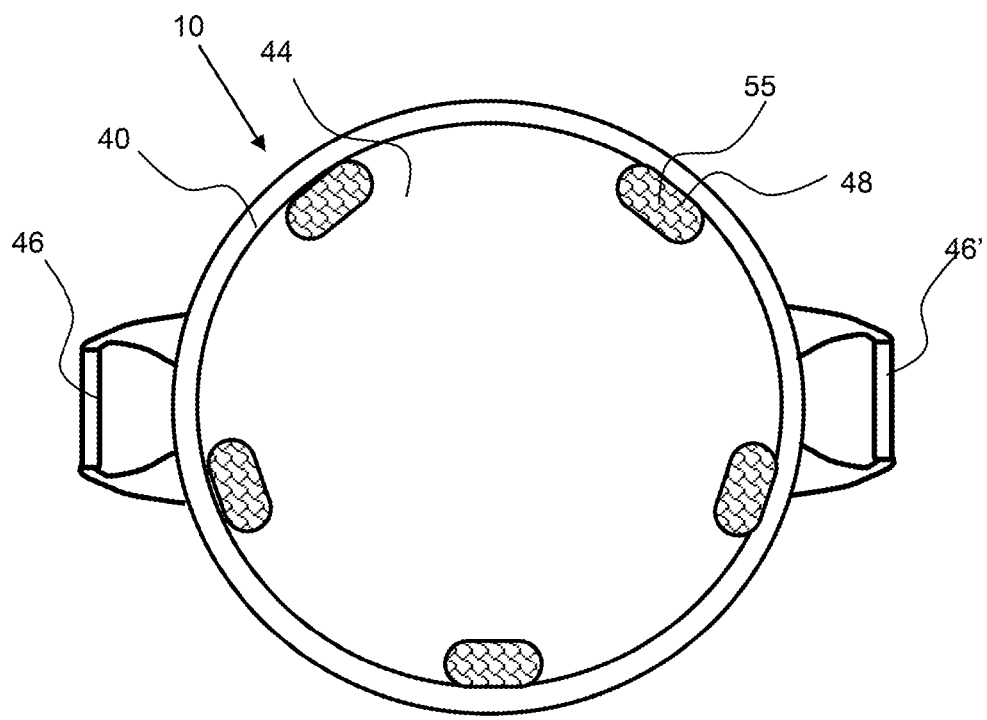
FIG. 6 shows a bottom view of an exemplary tote having a plurality of discrete hook-and-loop fasteners on the bottom surface for detachable attachment to the tote shown in FIG. 5.

Referring now to FIGS. 5 and 6, an exemplary dolly 60 is configured to retain the tote 40 shown in FIG. 6, by hook-and-loop fasteners. The discrete dolly hook-and-loop fasteners 75 are discrete hook-and-loop pads or portions configured substantially uniformly around the dolly, on the top surface 62 of the dolly. The tote has a plurality of discrete hook-and-loop fasteners 55 configured on the bottom 44 of the tote for engagement with the dolly hook-and-loop fasteners. These types of fasteners may be preferred, as it only requires the tote to be placed on the dolly, without alignment of buckles and engagement of buckles between the tote and dolly. Note that a ring of hook-and-loop fastener may be configured on one of the totes or the dolly and the other component may have discrete hook-and-loop fasteners as shown. It may be preferred not to have a complete ring of engagement of hook-and-loop fastener as this may be more difficult to disengage.

Figure 7:
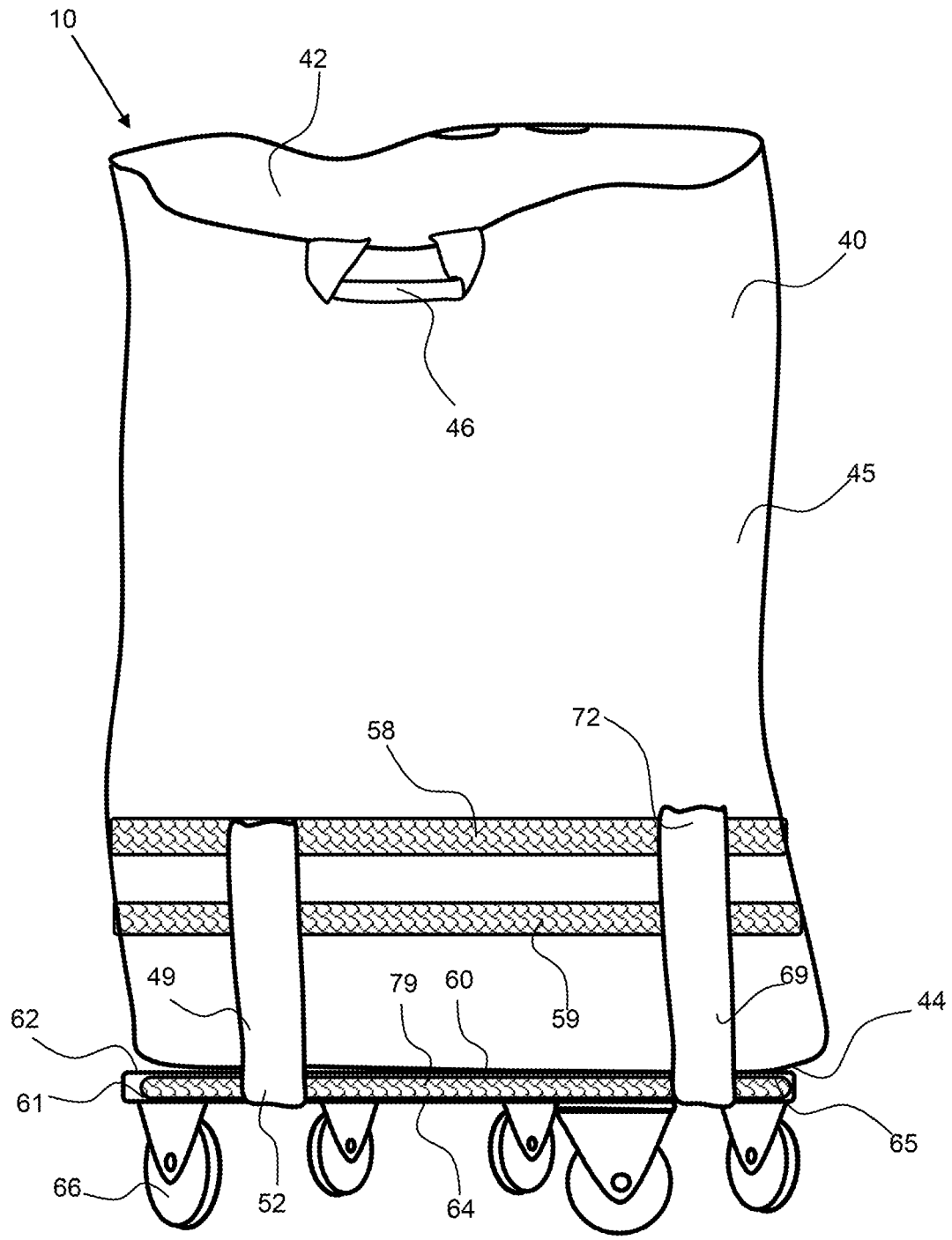
FIG. 7 shows a side view of an exemplary tote-dolly system comprising a tote detachably attached to a dolly and hook-and-loop fastener engagements between the tote and dolly.
Figure 8:
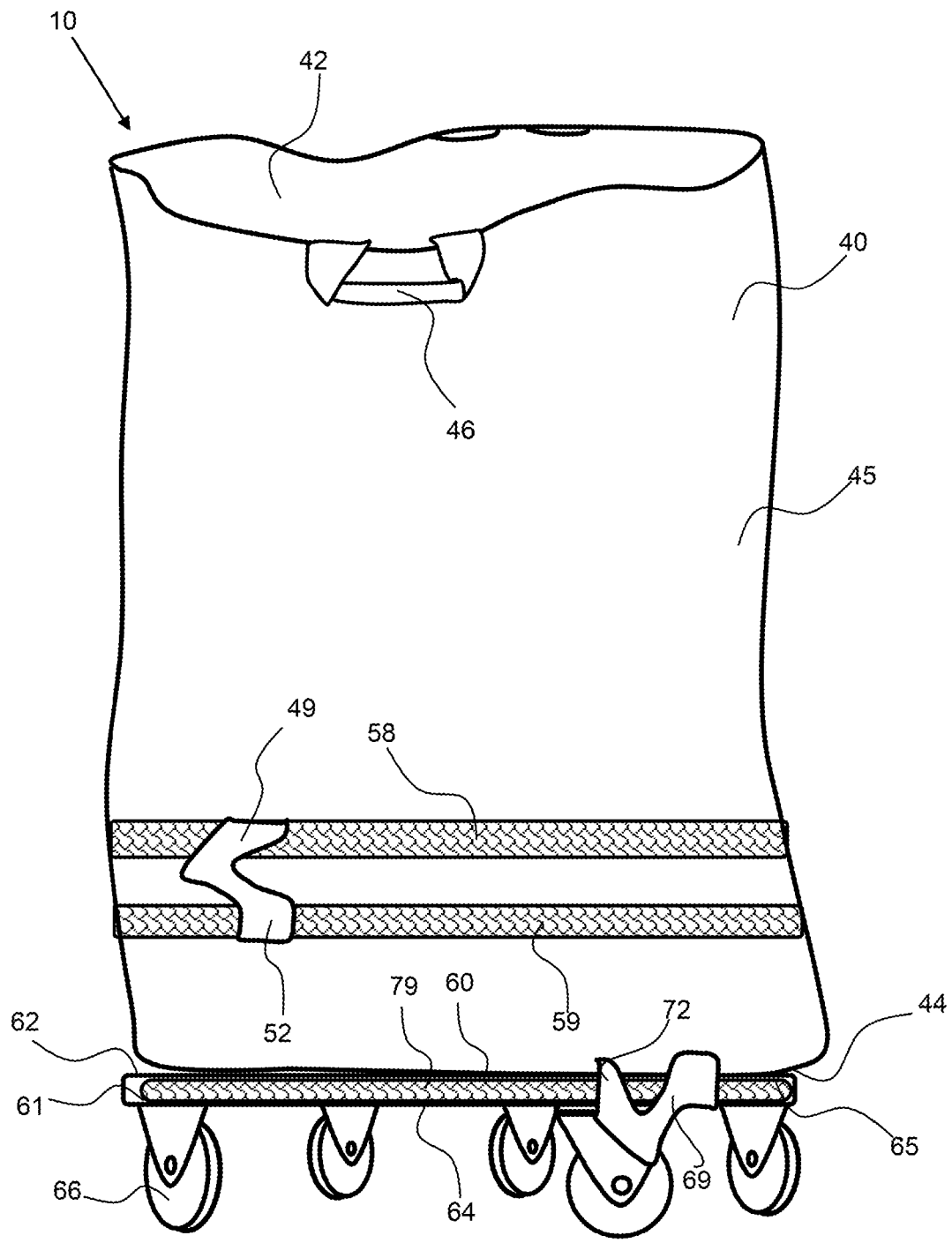
FIG. 8 show the exemplary tote-dolly system shown in FIG. 7 with the tote hook-and-loop fastener and dolly hook-and-loop fastener coupled to extensions and retainer on couplers for detachment of the tote from the dolly.

Referring now to FIGS. 7 and 8, an exemplary tote-dolly system 10 comprises a tote 40 detachably attached to a dolly 60 and hook-and-loop fastener engagements between the tote and dolly. As shown in FIG. 7, a tote hook-and-loop fastener 52 is configured on a fastener extension 49, coupled to the tote, and detachably attaches to a dolly hook-and-loop fastener 72, a dolly ring fastener 78 that extends around a perimeter 65 of the dolly. As shown in FIG. 8, the tote hook-and-loop fastener 52 is detached from the dolly ring fastener and is coupled to a tote fastener coupler 59. The tote fastener coupler retains the tote hook-and-loop fastener 52 in a secured position when not being used to couple the tote to the dolly.

As shown in FIG. 7, a dolly hook-and-loop fastener 72 is configured on a fastener extension 69, coupled to the dolly, and detachably attaches to a tote hook-and-loop fastener 52, a tote ring fastener 58 that extends around a perimeter 45 of the tote. As shown in FIG. 8, the dolly hook-and-loop fastener 72 is detached from the tote ring fastener 58 and is coupled to a dolly fastener coupler 79. The dolly fastener coupler retains the dolly hook-and-loop fastener 72 in a secured position when not being used to couple the dolly to the tote.

It will be apparent to those skilled in the art that various modifications, combinations and variations can be made in the present invention without departing from the scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A fabric tote and a dolly system comprising: a fabric tote, a dolly and a plurality of detachable dolly fastener extensions wherein said fabric tote has a top and a bottom and said fabric tote is supported by said dolly by attaching said fabric tote to said dolly so that said dolly is detachably attached to said bottom of said fabric tote using said dolly fastener extensions; and
  a) said fabric tote further comprising:
    i) said top has a top opening;
    ii) said bottom of the fabric tote having a first hook-and-loop fastener;
    iii) said top opening having an outer perimeter;
    iv) said fabric tote having a tote hook-and-loop fastener that extends as a ring fastener around said outer perimeter of the fabric tote a distance from the bottom of the fabric tote; and
    iv) said fabric tote having handles at said top opening;
  b) said dolly forming a platform to support said fabric tote comprising:
    i) said dolly forming a dolly frame and said dolly frame having a top and a bottom, the top of the dolly frame having a second hook-and-loop fastener connected thereto, whereby, the first hook-and-loop fastener of the tote is detachably connected to the second hook-and-loop fastener of the dolly frame when the tote is placed on the top of said dolly frame using said dolly fastener extensions;
    ii) wheels extending from the bottom of said dolly;
    iii) an outer perimeter; and
    iv) a dolly fastener coupler that extends around a perimeter of the dolly frame;
  c) said detachable dolly fastener extension extending from the dolly to the ring fastener on the tote and each having a dolly hook-and-loop fastener coupled thereto that is detachably attachable to the tote-fastener;
  wherein the dolly fastener coupler is configured to attach with the dolly hook-and-loop fasteners when the dolly hook-and-loop fasteners are not attached to the ring fastener of the tote; and
  wherein said tote handles are position on said tote so as to guide the tote-dolly system when said fabric tote is attached to said dolly and to tote handles aid in picking up the fabric tote; and
  the fabric tote is detachably attachable to the dolly such that when said tote is detached from said dolly said tote and dolly are two separate pieces.

2. The tote-dolly system of claim 1, wherein the dolly comprises at least three hook-and-loop fasteners.

3. The tote-dolly system of claim 1, wherein dolly-fastener extension is at least 50 mm in length from the dolly to the dolly-fastener.

4. The tote-dolly system of claim 1, wherein the ring fastener of the tote hook-and-loop fastener extends at least 50% around a perimeter of the tote.

5. The tote-dolly system of claim 1, wherein the dolly fastener coupler extends at least 50% around the perimeter of the dolly frame.

* * * * *